(12) United States Patent
Worden et al.

(10) Patent No.: US 12,497,812 B2
(45) Date of Patent: Dec. 16, 2025

(54) LIFT ASSIST SYSTEM FOR VEHICLE TAILGATES

(71) Applicant: Multimatic Inc., Markham (CA)

(72) Inventors: Scott Worden, Markham (CA); Muamer Hodza, Markham (CA); Scott Wellman, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 18/838,698

(22) PCT Filed: Feb. 17, 2023

(86) PCT No.: PCT/CA2023/050208
§ 371 (c)(1),
(2) Date: Aug. 15, 2024

(87) PCT Pub. No.: WO2023/155014
PCT Pub. Date: Aug. 24, 2023

(65) Prior Publication Data
US 2025/0108867 A1    Apr. 3, 2025

Related U.S. Application Data

(60) Provisional application No. 63/311,790, filed on Feb. 18, 2022.

(51) Int. Cl.
*B62D 33/027*     (2006.01)
*E05F 1/12*       (2006.01)

(52) U.S. Cl.
CPC ........ *E05F 1/1292* (2013.01); *B62D 33/0273* (2013.01); *E05Y 2201/624* (2013.01);
(Continued)

(58) Field of Classification Search
CPC .. B62D 33/0273; B62D 33/03; B62D 33/033; E05Y 2900/544; E05Y 2900/516;
(Continued)

(56) References Cited

U.S. PATENT DOCUMENTS 6,769,729 B1   8/2004   Bruford et al.
6,773,047 B2   8/2004   Gruber
(Continued)

FOREIGN PATENT DOCUMENTS

CN    102410334 A    4/2012
JP    2005-517104 A  6/2005
RU      2144878 C1   1/2000

OTHER PUBLICATIONS

International Search Report and Written Opinion for International Application No. PCT/CA2023/050208, date of mailing May 24, 2024.

*Primary Examiner* — Gregory A Blankenship
(74) *Attorney, Agent, or Firm* — Borden Ladner Gervais LLP; Brandon L. Evenson (57) ABSTRACT

A vehicle tailgate lift assist system comprises a vehicle tailgate adapted to open and close by rotating about a tailgate pivot axis in relation to a vehicle body, coupling means to releasably connect the vehicle tailgate and the vehicle body, an energy storage device located within the vehicle body and adapted to be pivotally anchored to the vehicle body at one end, a crank arm pivotally attached to the energy storage device at a second end of the energy storage device and rigidly attached to an actuation shaft that is coaxially aligned with the tailgate pivot axis, and a pivot bracket assembly comprising a mounting bracket fixed to the vehicle body and holding a pivot bearing arrangement to facilitate a rotary joint about the tailgate pivot axis. The pivot bearing arrangement comprises a unitary component overmolded to a pivot sleeve to act as a bushing between the actuation shaft and the pivot sleeve, such that relative rotary motion of the tailgate and the vehicle body results in linear movement of the energy storage device and maximum energy storage at the tailgate fully open position.

11 Claims, 7 Drawing Sheets

(52) U.S. Cl.
CPC ... *E05Y 2201/628* (2013.01); *E05Y 2800/676* (2013.01); *E05Y 2800/682* (2013.01); *E05Y 2900/544* (2013.01)

(58) Field of Classification Search
CPC ......... E05Y 2201/628; E05Y 2201/632; E05F 1/1091; E05F 1/1292
See application file for complete search history.

(56) References Cited

U.S. PATENT DOCUMENTS

| | | | | |
|---|---|---|---|---|
| 7,147,260 | B2* | 12/2006 | Eschebach | B62D 33/0273 296/57.1 |
| 7,533,920 | B2* | 5/2009 | Ohly | B62D 33/0273 296/57.1 |
| 7,556,305 | B2* | 7/2009 | Stratten | B62D 33/03 296/57.1 |
| 7,695,043 | B2* | 4/2010 | Zagoroff | B62D 33/03 296/57.1 |
| 8,100,456 | B2* | 1/2012 | Townson | E05F 1/1292 296/57.1 |
| 8,226,146 | B2* | 7/2012 | Duffy | E05D 7/1072 16/84 |
| 9,234,378 | B2* | 1/2016 | Hansen | E05F 15/63 |
| 2004/0108743 | A1 | 6/2004 | Gruber | |
| 2005/0200150 | A1 | 9/2005 | Austin | |
| 2008/0224494 | A1 | 9/2008 | Anderson et al. | |
| 2012/0199431 | A1 | 8/2012 | Pasino | |
| 2020/0399943 | A1* | 12/2020 | Ulewicz | B62D 33/0273 |
| 2021/0237808 | A1* | 8/2021 | Ghoukasian | B62D 33/037 |
| 2021/0371017 | A1 | 12/2021 | Heins et al. | |
| 2022/0089227 | A1* | 3/2022 | Sridhar | B62D 33/077 |
| 2022/0379978 | A1* | 12/2022 | Pencak | E05F 1/12 |
| 2025/0026415 | A1* | 1/2025 | Borkar | B62D 33/027 |
| 2025/0108867 | A1* | 4/2025 | Worden | E05F 1/1292 |

* cited by examiner

LIFT ASSIST SYSTEM FOR VEHICLE TAILGATES

FIELD OF THE INVENTION

This invention is in the field of vehicle tailgates and means for opening, holding open and closing thereof.

BACKGROUND

Vehicle tailgates, particularly for pick-up trucks, must be able to be opened and closed easily and are preferably also removable from the vehicle body. It is also desirable to provide a lift assist feature to provide damping to resist the force of gravity acting on an opening tailgate while storing energy, then to dissipate that stored energy to assist in closing the tailgate by significantly overcoming the force of gravity acting on the tailgate. A very useful means to achieve both objectives of tailgate removability and lift assist are described in U.S. Pat. No. 6,773,047 to Gruber.

The tailgate hinging joints of working pick-up trucks are typically exposed to a relatively hostile environment. Dust, dirt, salt, mud and other debris from road or off-road surfaces and work sites tend to degrade the operation of tailgate hinging joints. Loading and unloading cargo from the truck bed can also lead to debris coming into contact with such joints. Such debris can lead to unwanted friction between parts at the joint which can inhibit smooth tailgate opening and closing as well as leading to wear of the parts themselves. Weather, including precipitation and exposure of the system to moisture and electrolytes, may also contribute to degradation in the performance of a tailgate opening and closing system.

Moreover, tailgates may be subject to significant vibrational and inertial loads as the vehicle negotiates uneven road surfaces or other terrain. Removable tailgates also necessarily have relatively loose fittings to permit tailgate removal and reinstallation without undue effort or damage to the tailgate or vehicle body. The combination of environmental, vibrational and inertial effects, dirt ingress into the loose hinging joints, and other such factors, can lead to wear and instability over time.

Accordingly, it would be advantageous to provide a removable vehicle tailgate system which reduces exposure of the joint system mechanism to debris, weather and other external factors. It would also be advantageous to provide a removable tailgate system which reduces the effect of vibrational and inertial loads. In addition, it would be advantageous to provide a removable vehicle tailgate system which is robust and which reduces wear and instability. Further, it would be beneficial to provide these advantages with a reduced number of parts.

SUMMARY

U.S. Pat. No. 6,773,047 illustrates a mechanism to allow attachment and removal of a tailgate from a vehicle body. Among the components on the vehicle body side of the mechanism are two bushings which permit an actuation shaft to rotate inside a sleeve structure while remaining aligned with a pivot bracket axis around which the tailgate pivots. A male slot drive feature is coaxially attached to the actuation shaft via a screw. The screw also retains the actuation shaft and entire pivotable assembly in the rigid body pivot bracket while allowing rotational motion. In addition, an external bearing surface feature of a tailgate pivot bracket interfaces with an internal bearing surface feature of a tailgate pivot bracket to create a rotary joint.

We have found that by combining the functions of the two actuation shaft bushings into a unitary bushing component overmolded to the actuation shaft, and eliminating the male slot drive feature and screw, a simpler, robust structure which reduces environmental, vibrational and inertial effects is achieved. In addition, providing annular ribs at opposite ends of the overmolded bushing, which ribs are compressed when the mechanism is assembled, provides an excellent sealing fit with the rotating actuation shaft assembly, preventing ingress of debris and foreign matter into the joint.

A pivot bracket assembly, mounted to the body side of the vehicle, comprises multiple components. Central to the pivot bracket assembly is an actuation shaft, or drive shaft. The drive shaft preferably comprises an overmolded drive head which is adapted to releasably engage a corresponding drive cup mounted to the tailgate. This releasability feature allows the tailgate to be removed from the vehicle when desired. A crank arm is rigidly mounted at the opposite end of the drive shaft. Typically, an opening or orifice in the crank arm slides over an end of the drive shaft and is held in place by swaging the end of the drive shaft against the crank arm. Of course, other conventional means to hold the crank arm to the drive shaft are possible, such as welding, staking, using a threaded connector like a nut over a threaded end section of the drive shaft, and the like. Swaging, however, allows the lift assist mechanism to be connected together firmly with minimum cost and without additional fasteners or fastening.

At the end of the crank arm distal to the drive shaft, the crank arm is rotationally connected to an end of an energy storage device, typically a pneumatic cylinder, or gas strut. The far end of the gas strut is rotationally connected to the vehicle body. Thus, as the tailgate is opened, the connected drive cup and drive head cause rotation of the drive shaft which rotates the crank arm and extends the gas strut, thus simultaneously controlling the opening of the tailgate and storing energy in the gas strut to assist with eventual closing of the tailgate.

The pivot bracket assembly further comprises a pivot sleeve connected to a mounting bracket which, in turn, is mounted to the vehicle body, typically at a D-pillar in a the cargo section of a pick-up truck. The pivot sleeve is adapted to rotate about the drive shaft as the drive shaft rotates. In order to facilitate this relative rotation, a pivot bushing lies between the pivot sleeve and the drive shaft. Preferably, the pivot bushing comprises a unitary component overmolded to the pivot sleeve. The pivot bushing may be formed of a plastic or similar synthetic material.

In order to seal the pivot bracket assembly from the elements and debris, among other foreign matter, one or more ribs are provided at the ends of the pivot bushing. The ribs, which are preferably circular and annular, may be compressed during assembly of the system onto the drive head located at a first end of the drive shaft, and onto the crank arm mounted onto the opposite second end of the drive shaft. Riveting, by swaging or similar technique, of the second end of the drive shaft to secure the crank arm provides sufficient force to compress the ribs at either end of the overmolded bushing onto the crank arm and the drive head respectively. The drive head provides an external bearing surface which fits reversibly into the drive cup mounted to the tailgate. The drive head may be formed of a plastic or similar synthetic material overmolded to one end of the drive shaft. This provides a reduced friction external bearing surface which helps to absorb vibration. Alternatively, a steel or other metal drive head fixed to, or integral with, the drive shaft may be used. Other materials such as hardened plastic or other synthetic materials could form the drive shaft, if desired.

In a principal aspect of the invention, a vehicle tailgate lift assist system comprises a vehicle tailgate adapted to open and close by rotating about a tailgate pivot axis in relation to a vehicle body, coupling means to releasably connect the vehicle tailgate and the vehicle body, an energy storage device located within the vehicle body and adapted to be pivotally anchored at a first end to the vehicle body, a crank arm pivotally attached to a second end of the energy storage device and rigidly attached to an actuation shaft that is coaxially aligned with the tailgate pivot axis, a pivot bracket assembly comprising a mounting bracket fixed to the vehicle body and holding a pivot bearing arrangement to facilitate a robust rotary joint about the tailgate pivot axis, wherein the pivot bearing arrangement comprises a unitary component overmolded to a pivot sleeve to act as a bushing between the actuation shaft and the pivot sleeve, such that relative rotary motion of the tailgate and the vehicle body results in linear extension of the energy storage device and maximum energy storage at the tailgate fully open position.

In a further aspect, opposite ends of the overmolded bushing are provided with circular sealing ribs.

In a further aspect, the sealing ribs are compressed against the crank arm at one end of the overmolded bushing and against a drive head at the other end of the overmolded bushing.

In a further aspect, the sealing ribs are compressed when a second end of the drive shaft adjacent the crank arm is swaged over the crank arm.

In a further aspect, the bushing is formed of plastic or similar synthetic material.

In a further aspect, the energy storage device comprises a gas strut.

In a further aspect, the coupling means comprises a drive head at a first end of the drive shaft and a drive cup connected to the vehicle tailgate.

In a further aspect, the drive head is overmolded to the drive shaft.

In a further aspect, the drive head is formed of plastic or similar synthetic material.

In a further aspect, the pivot axis runs through the drive head and the drive cup when they are engaged.

Further aspects of the lift assist system for vehicle tailgates will be apparent from the following description and illustrations.

DETAILED DESCRIPTION

Figure 1:
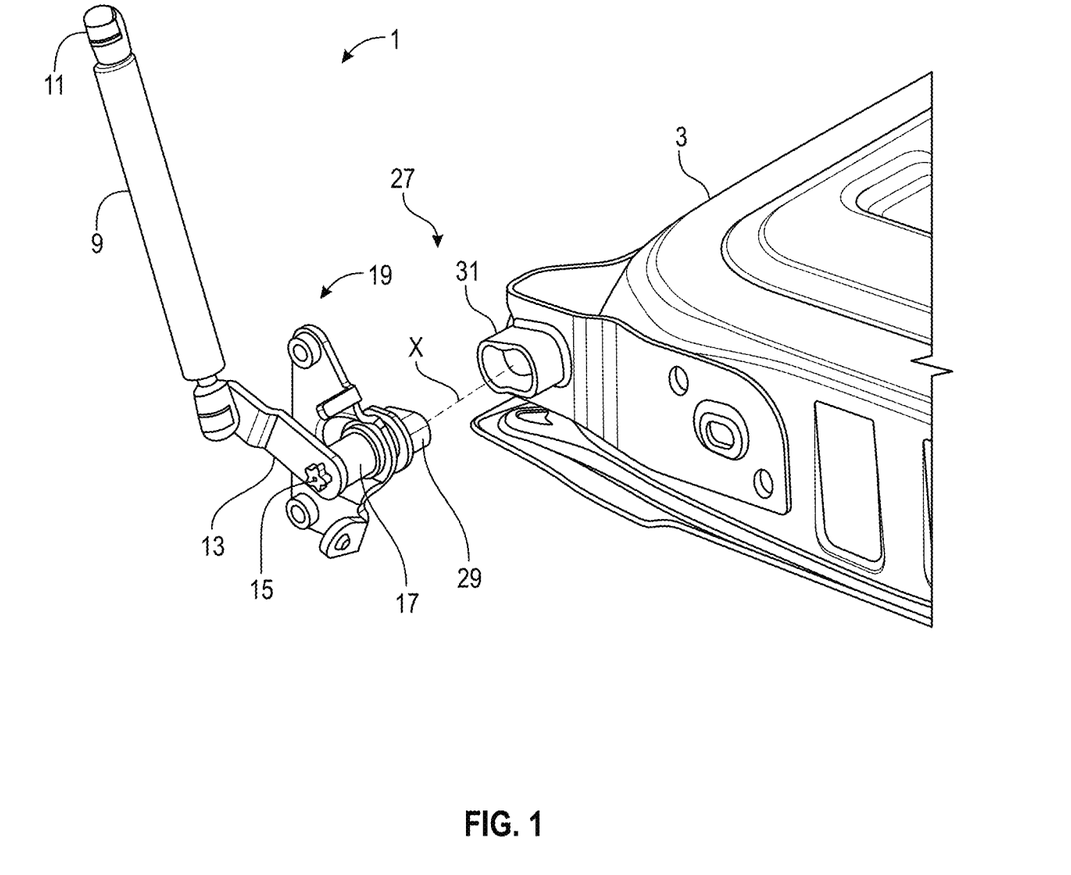
FIG. 1 is a perspective view of elements of the lift assist system for vehicle tailgates and a vehicle tailgate.
Figure 2:
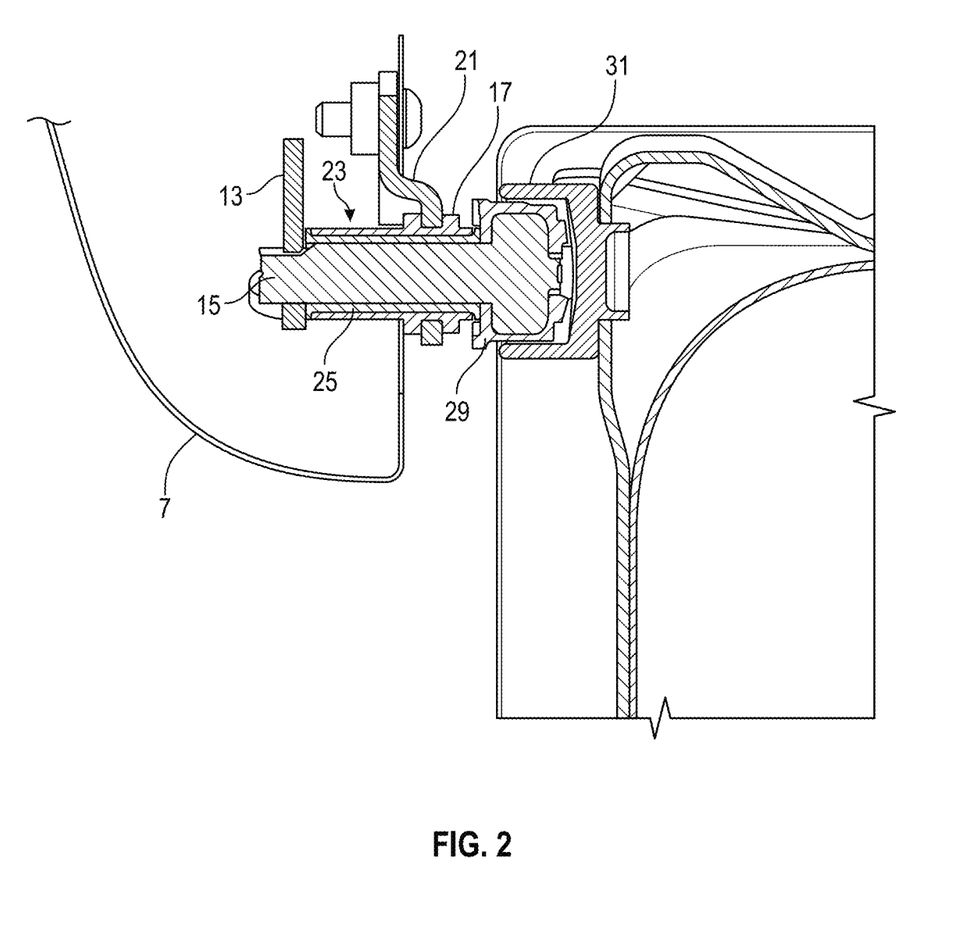
FIG. 2 is an elevational, cross-sectional view of the lift assist system for vehicle tailgates showing its attachment to a vehicle body and engagement with a vehicle tailgate.
Figure 3:
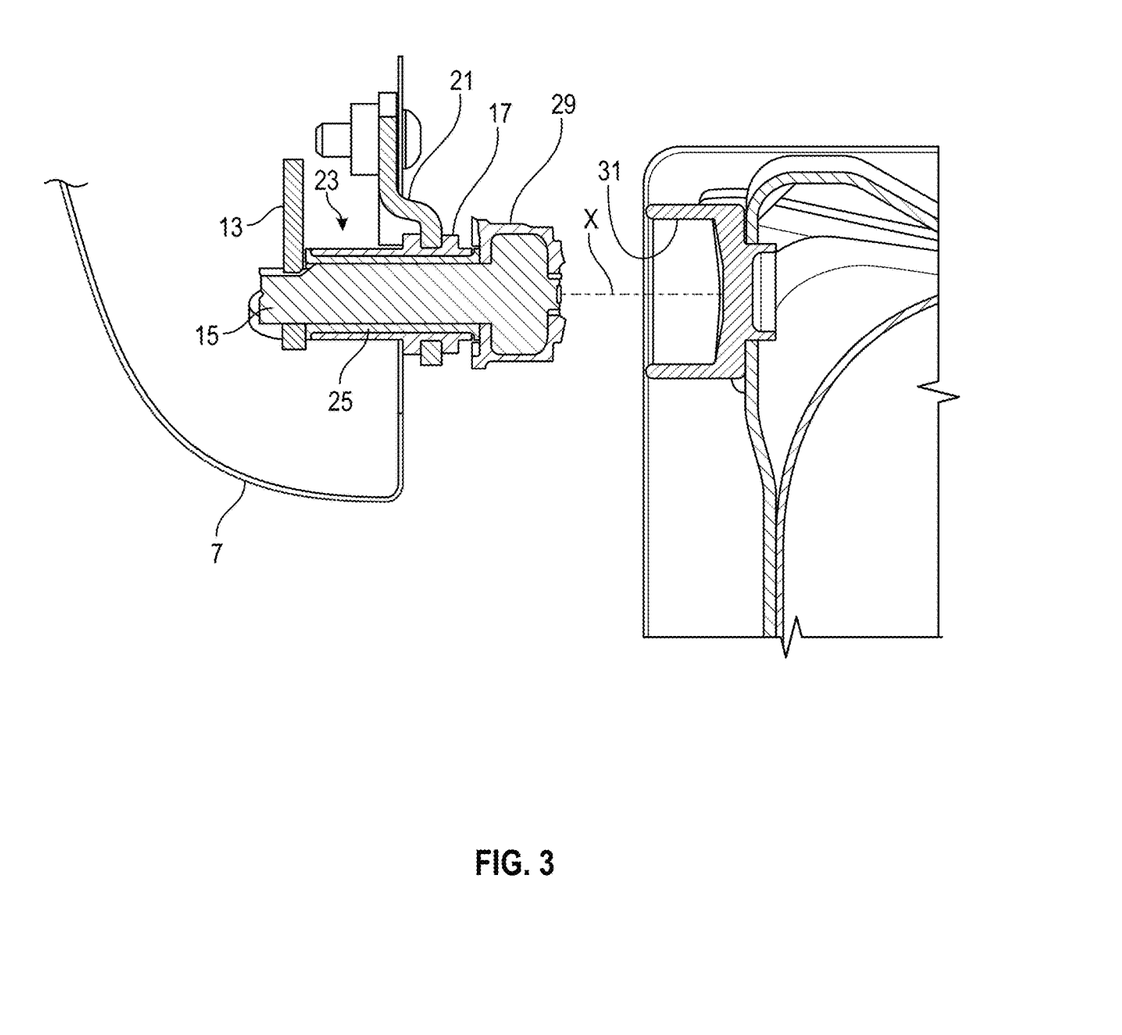
FIG. 3 is an elevational, cross-sectional view of the lift assist system for vehicle tailgates showing the system attached to a vehicle body and disengaged from a vehicle tailgate.
Figure 4:
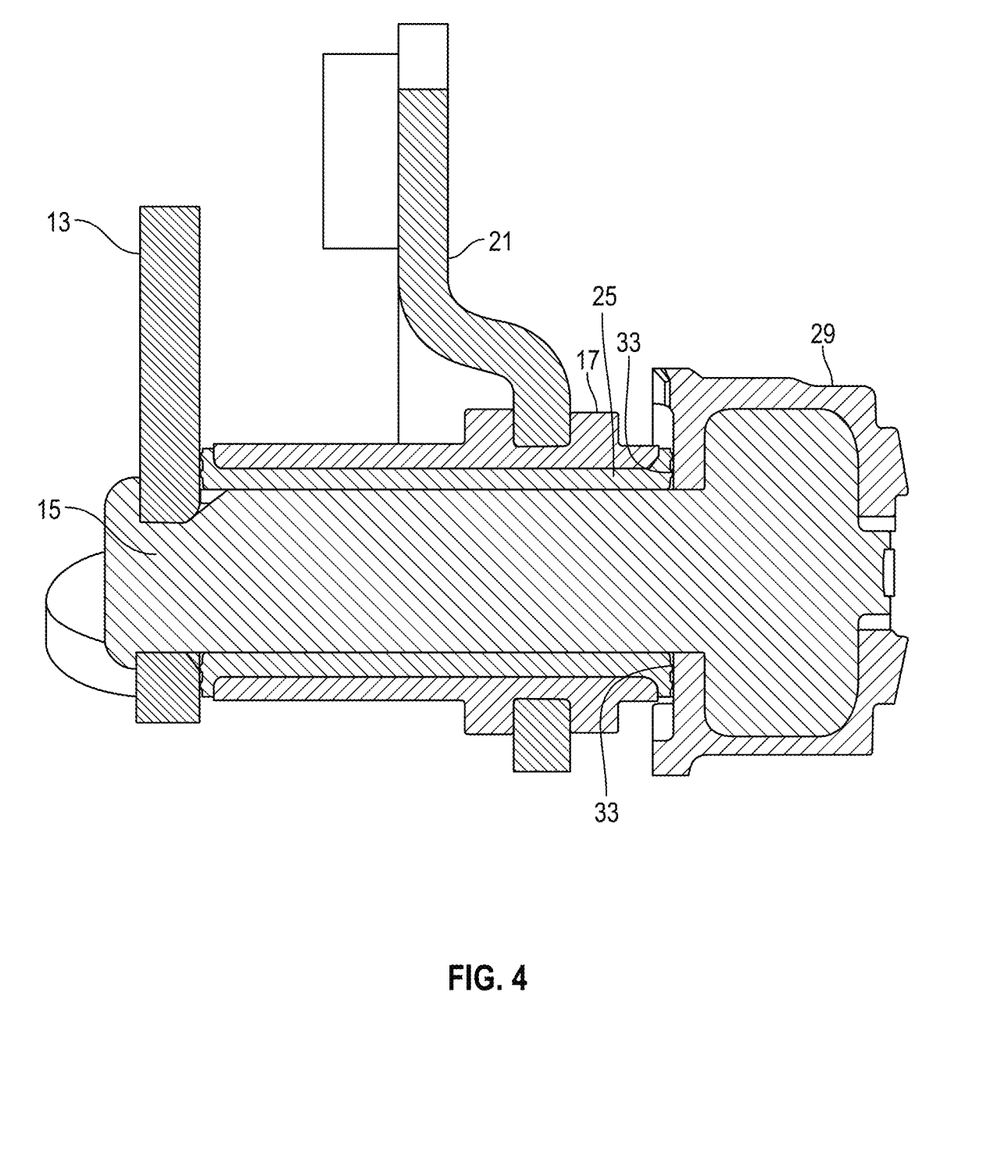
FIG. 4 is an elevational, cross-sectional view of a portion of the lift assist system for vehicle tailgates.
Figure 5:
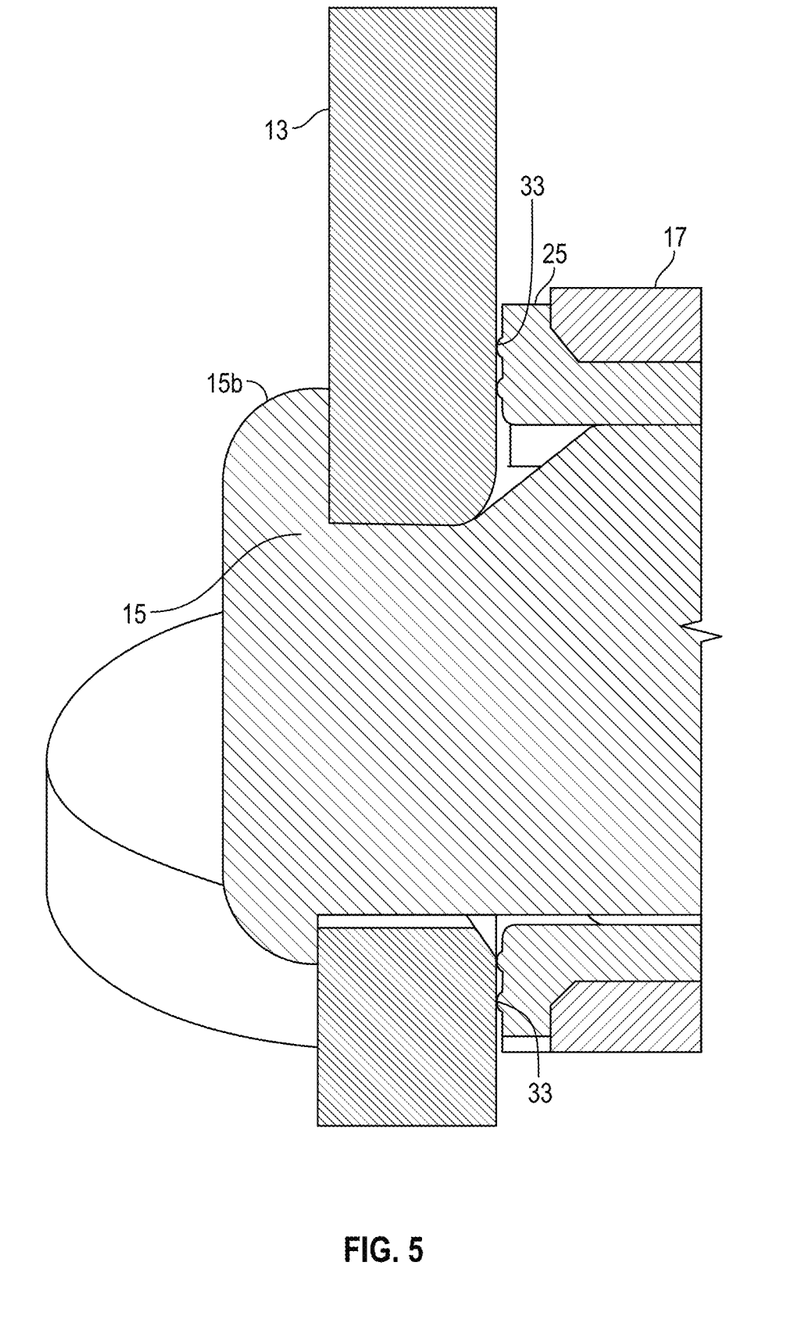
FIG. 5 is an elevational, cross-sectional view of a portion of the lift assist system for vehicle tailgates showing sealing of the pivot bushing to the crank arm via ribs and the drive shaft riveted to the crank arm.
Figure 6:
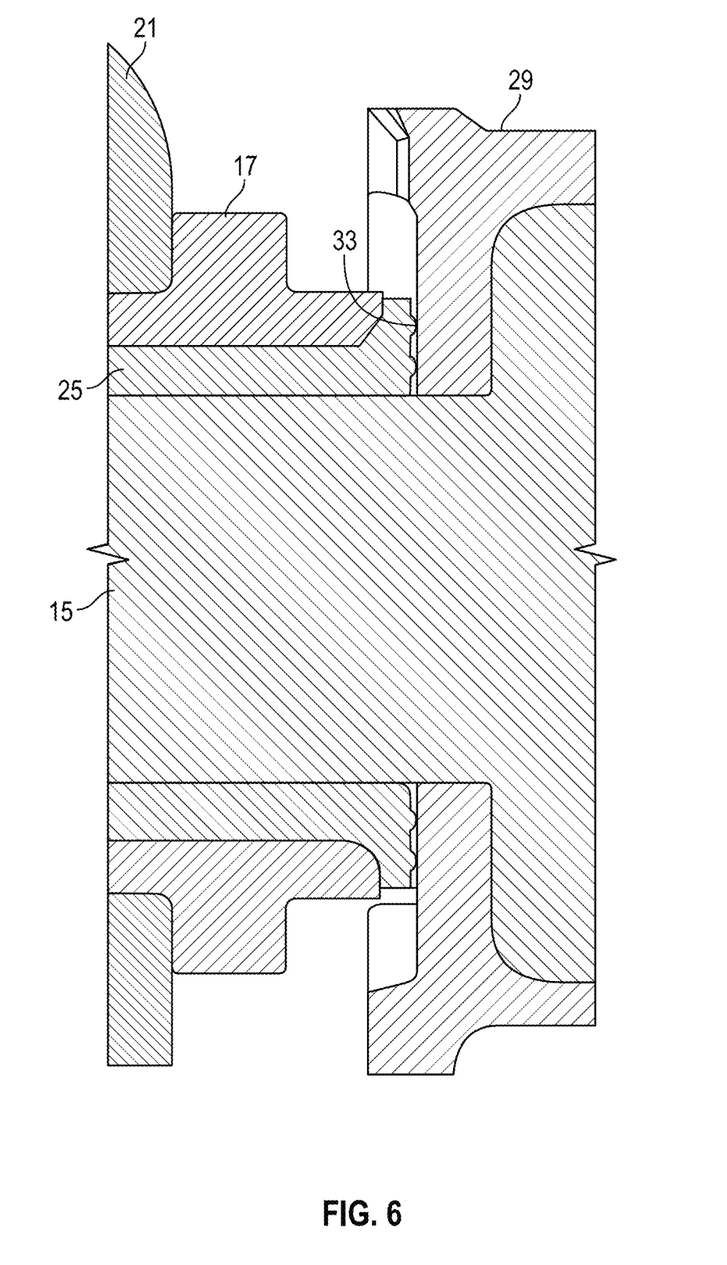
FIG. 6 is an elevational, cross-sectional view of a portion of the lift assist system for vehicle tailgates showing sealing of the pivot bushing to the drive head via ribs.
Figure 7:
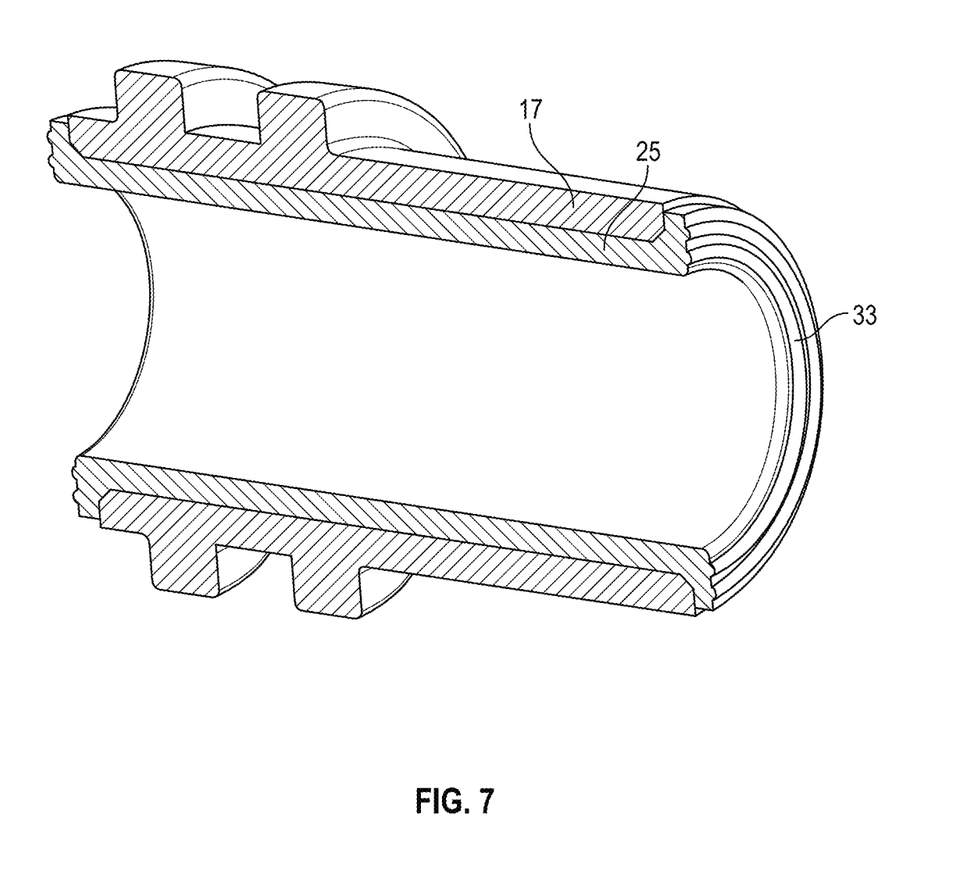
FIG. 7 is a perspective, cross-sectional view of the pivot sleeve with overmolded pivot bushing.

Referring to FIG. 1, the vehicle tailgate lift assist mechanism 1 releasably connects a vehicle body 7 and a tailgate 3. The tailgate 3 rotates about a tailgate pivot axis X. The lift assist mechanism 1 is affixed to the vehicle body 7 as described herein. An actuation shaft, or drive shaft, 15 is rigidly connected at a second end to a crank arm 13. The opposite first end of the drive shaft 15 comprises a drive head 29. The drive head 29 may comprise the material, typically metal, of the drive shaft, but is preferably overmolded to the drive shaft 15 and made of plastic or other synthetic material. The drive head 29 engages with a drive cup 31 mounted to the tailgate 3. The drive head and the drive cup together comprise coupling means 27. When the drive head 29 is engaged with the drive cup 31, the tailgate 3 may rotate about pivot axis X.

The end of the crank arm 13 not connected to the drive shaft 15 is rotatably connected to an energy storage device, typically a gas strut 9. The gas strut 9 is pivotally connected to the vehicle body 7, such as by pivotal anchor 11. As the tailgate 3 is opened when the drive head 29 and the drive cup 31 are engaged, the drive shaft 15 rotates the crank arm 13 and extends the gas strut 9 to store energy. Resistance of the gas strut 9 allows the tailgate to open in a controlled manner. Energy stored in the gas strut 9 during tailgate opening assists in overcoming the weight of the tailgate 3 when closing the tailgate 3. The drive shaft 15 rotates within a pivot sleeve 17 which is held in place by a mounting bracket 21. This assembly comprises a pivot bracket assembly 19.

The pivot bracket assembly 19 comprises a pivot bearing arrangement 23 which allows rotation of the drive shaft 15 within the pivot sleeve 17. The pivot bearing arrangement further comprises a unitary component 25 overmolded to the pivot sleeve 17 which functions as a pivot bushing. Each end of the pivot bushing 25 is provided with circular or annular ribs 33 which respectively compress against the drive head 29 and the crank arm 13 when the pivot bracket assembly 19 is assembled. This compression of the annular ribs 33 against the drive head 29 and the crank arm 13 seal the unit against debris, moisture or other undesirable outside influences. Typically, this compression occurs when the second end 15b of the drive shaft 15 is swaged or riveted over the crank arm 13.

The mounting bracket 21 mounted to the body 7 holds the pivot sleeve 17 from rotation in relation to the drive shaft 15. The mounting bracket may be fixed to the body 7, typically the D-pillar of the truck bed, by bolting, welding or other conventional methods.

What is claimed is:
1. A vehicle tailgate lift assist system, comprising:
 a) a vehicle tailgate adapted to open and close by rotating about a tailgate pivot axis in relation to a vehicle body;
 b) coupling means to releasably connect the vehicle tailgate and the vehicle body;
 c) an energy storage device located within the vehicle body and adapted to be pivotally anchored at a first end to the vehicle body;

d) a crank arm pivotally attached to a second end of the energy storage device and rigidly attached to an actuation shaft that is coaxially aligned with the tailgate pivot axis;

e) a pivot bracket assembly comprising a mounting bracket fixed to the vehicle body and holding a pivot bearing arrangement to facilitate a rotary joint about the tailgate pivot axis;

f) wherein the pivot bearing arrangement comprises a unitary component overmolded on a pivot sleeve to act as a bushing between the actuation shaft and the pivot sleeve, and the overmolded bushing sealably engages the crank arm at one end of the overmolded bushing and the actuation shaft at the opposite end of the overmolded bushing;

such that relative rotary motion of the tailgate and the vehicle body results in linear extension of the energy storage device and maximum energy storage at the tailgate fully open position.

2. The vehicle tailgate lift assist system of claim 1, wherein opposite ends of the overmolded bushing are each provided with at least one circular sealing rib.

3. The vehicle tailgate lift assist system of claim 2, wherein the at least one circular sealing rib at the opposite ends of the overmolded bushings are respectively compressed against the crank arm and a drive head of the actuation shaft.

4. The vehicle tailgate lift assist system of claim 3, wherein the sealing ribs are compressed when a second end of the actuation shaft adjacent the crank arm is swaged over the crank arm.

5. The vehicle tailgate lift assist system of claim 1, wherein
the bushing is formed of plastic.

6. The vehicle tailgate lift assist system of claim 1, wherein the energy storage device comprises a gas strut.

7. The vehicle tailgate lift assist system of claim 1, wherein the coupling means comprises a drive head at a first end of the actuation shaft and a drive cup connected to the vehicle tailgate.

8. The vehicle tailgate lift assist system of claim 7, wherein the drive head is overmolded to the actuation shaft.

9. The vehicle tailgate lift assist system of claim 8, wherein the drive head is formed of plastic.

10. The vehicle tailgate lift assist system of claim 7, wherein the pivot axis runs through the drive head and the drive cup when they are engaged.

11. The vehicle tailgate lift assist system of claim 2, wherein the at least one circular sealing rib comprises annular sealing ribs.

\* \* \* \* \*